(12) United States Patent
Isberg et al.

(10) Patent No.: US 6,201,975 B1
(45) Date of Patent: *Mar. 13, 2001

(54) METHOD AND DEVICE RELATING TO A USER UNIT

(75) Inventors: Johanna Brita Isberg; Torbjörn Andersson, both of Lund; Jan Ragnar Rubbmark, Malmö, all of (SE)

(73) Assignee: Telefonaktiebolaget LM Ericsson, Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/888,056

(22) Filed: Jul. 3, 1997

(30) Foreign Application Priority Data

Jul. 3, 1996 (SE) .................................................. 9602634

(51) Int. Cl.⁷ ........................................................ H04Q 7/22
(52) U.S. Cl. .............................................................. 455/557
(58) Field of Search ...................... 455/418, 419, 455/420, 556, 557

(56) References Cited

U.S. PATENT DOCUMENTS

| | | |
|---|---|---|
| 5,430,793 | 7/1995 | Ueltzen et al. . |
| 5,488,650 | 1/1996 | Greco et al. . |
| 5,754,953 * | 5/1998 | Briancon et al. ...................... 455/418 |
| 5,794,142 * | 8/1998 | Vanttila et al. ...................... 455/419 |
| 5,802,467 * | 9/1998 | Salazar et al. ........................ 455/419 |
| 5,848,356 * | 12/1998 | Jambhekar et al. .................. 455/418 |

FOREIGN PATENT DOCUMENTS

| | | |
|---|---|---|
| 0 654 927A2 | 5/1995 | (EP) . |
| 0 695 072A2 | 1/1996 | (EP) . |
| 0 715 441A1 | 6/1996 | (EP) . |
| 2 162 393 | 1/1986 | (GB) . |
| 92/20167 | 11/1992 | (WO) . |
| 95/25397 | 9/1995 | (WO) . |

OTHER PUBLICATIONS

PCT International–Type Search Report.

* cited by examiner

*Primary Examiner*—Emanuel Todd Voeltz
*Assistant Examiner*—M. David Sofocleous
(74) *Attorney, Agent, or Firm*—Burns, Doane, Swecker & Mathis, L.L.P.

(57) ABSTRACT

A method of creating a user menu (AM1) in a display (2, 22) in a user unit (1, 21, 41). The user menu (AM1) denotes an accessory unit (5, 25a) connected to the user unit (1, 21, 41). Information (I1, I2) is stored in a menu storage unit (3, 23) in the user unit (1, 21). The information (I1, I2) is used to create a standard menu (SM1). The accessory unit (5, 25a) is connected to the user unit (1, 21), and a menu selection code (MCODE) is sent from the accessory unit (5, 25a) to the menu storage unit (3, 23) in the user unit (1, 21). A standard menu (SM1), which corresponds to the menu selection code (MCODE), is pointed out in the menu storage unit (3, 23). The pointed out standard menu (SM1) is adapted to a user menu (AM1) corresponding to the menu selection code (MCODE), and the user menu (AM1) is activated in the display (2, 22).

21 Claims, 8 Drawing Sheets

METHOD AND DEVICE RELATING TO A USER UNIT

TECHNICAL FIELD

The present invention relates to a method of activating a user menu in a user unit presentation means. The invention also relates to a menu activating device.

BACKGROUND OF THE INVENTION

It is usual within rapidly growing technical fields to provide a user unit, such as a telephone for instance, with additional equipment that has been produced subsequent to the production of the user unit. When there is no or little support for later produced equipment, the additional equipment and other auxiliaries function to only a limited extent with the earlier produced user unit, or sometimes not at all. When there is a need to be able to use later produced additional equipment with the older user unit, it is necessary to be able to operate the additional equipment from the user unit. This presents a problem, of course, since the additional equipment was not known at the time of producing the user unit.

Telecommunications is an example of the aforementioned technical field, and a telephone that includes a display is one example of a device. U.S. Pat. No. 5,488,650 teaches a system that allows a telephone user to create a menu of his/her choice for an accessory unit connected to the telephone, by pressing appropriate buttons on the keypad. The drawback with this solution is that it requires the user to contribute actively towards creating the menu.

U.S. Pat. No. 5,430,793 teaches a method of configuring a computer system for use in different countries with different telecommunications systems, and logic for displaying in the computer system an options menu that adapts to the telecommunications system used on that occasion. The drawback with the invention disclosed in this publication is that it is necessary to pre-store those telecommunications systems to which the computer system can be connected. This excludes future telecommunications systems that were not known at the time of storing said possible telecommunications systems.

SUMMARY OF THE INVENTION

The present invention addresses problems that occur when handling one or more accessory units that have been connected to a user unit. One problem addressed by the invention is concerned with the additional memory capacity for the menu support or backup required in the user unit when additional, or accessory, equipment is connected. Another problem addressed by the invention is concerned with the case in which the accessory lacks menu support in the user unit, for instance because the accessory has been produced after the user unit was produced.

These problems are solved in accordance with the invention in that menu information is transferred from the accessory unit to the user unit when the device and unit are mutually connected. A user menu is created in the user unit with the aid of this menu information. The accessory unit can then be operated from the unit with the aid of the menu. When the accessory unit is no longer connected to the user unit, the memory space earlier used in the user unit to accommodate the menu information of the accessory unit is released.

The inventive method is begun by storing different standard menus in the user unit. When an accessory unit of later production is connected to the unit, a menu code is transmitted to the unit from the accessory unit. A standard menu is pointed out with the aid of the menu code. The standard menu is then adapted to the accessory unit with the aid of data in the menu code. The adapted standard menu, the so-called user menu, is thereafter activated in a presentation means, therewith enabling a user of the user unit to operate the accessory unit by pressing appropriate buttons on the keypad and with the aid of the menu. When the accessory unit is disconnected from the user unit, the memory space taken up in the user unit by the user memory of said device is released. The memory space can be used on a later occasion to create a user menu for another accessory unit that is connected to the user unit.

According to an alternative inventive solution to the problem, all of the information that is required to create the user memory is sent directly to the user unit, i.e. without first pointing out and adapting the aforesaid standard menu.

The invention also relates to a device for carrying out the method. The inventive device includes connection means to which the accessory unit can be connected, and a menu storage unit in which the various standard menus are stored, i.e. for those cases in which standard menus are used. The device also includes a presentation means, for instance a display, in which the user menu can be presented to a user.

The object of the present invention is to adapt a user unit in a manner which will enable additional equipment, or accessory equipment, that has been produced after producing the user unit can be operated from said user unit.

Another object of the invention is to adapt a user unit in a manner which will enable additional equipment, or accessory equipment that lacks a presentation means to be operated from the user unit with the aid of the user unit presentation means.

Another object of the invention is to enable this adaptation to be achieved without requiring active co-operation of the user unit.

Still another object of the invention is to solely use the memory space for a memory support in the user unit for additional equipment on those occasions when the additional equipment is connected to the user unit.

Still another object of the invention is to solely take-up memory space for one accessory unit even when more than one accessory unit has been connected to the user unit.

One advantage afforded by the present invention is thus that accessory units that have been produced, i.e. developed, subsequent to the development of the user unit can obtain a memory support in the user unit when said device is connected thereto.

Another advantage afforded by the invention is that no demands are placed on the user when creating a memory for the accessory unit, e.g. no manual studies are needed.

Still another advantage afforded by the invention is that memory space is released in the user unit when accessory equipment is not connected thereto.

Yet another advantage afforded by the invention is that additional equipment, or accessory units, produced by a producer other than the producer of the user unit can be connected to said unit.

The invention will now be described in more detail with reference to preferred embodiments thereof and also with reference to the accompanying drawings.

DETAILED DESCRIPTION OF PREFERRED EMBODIMENTS

Figure 1:
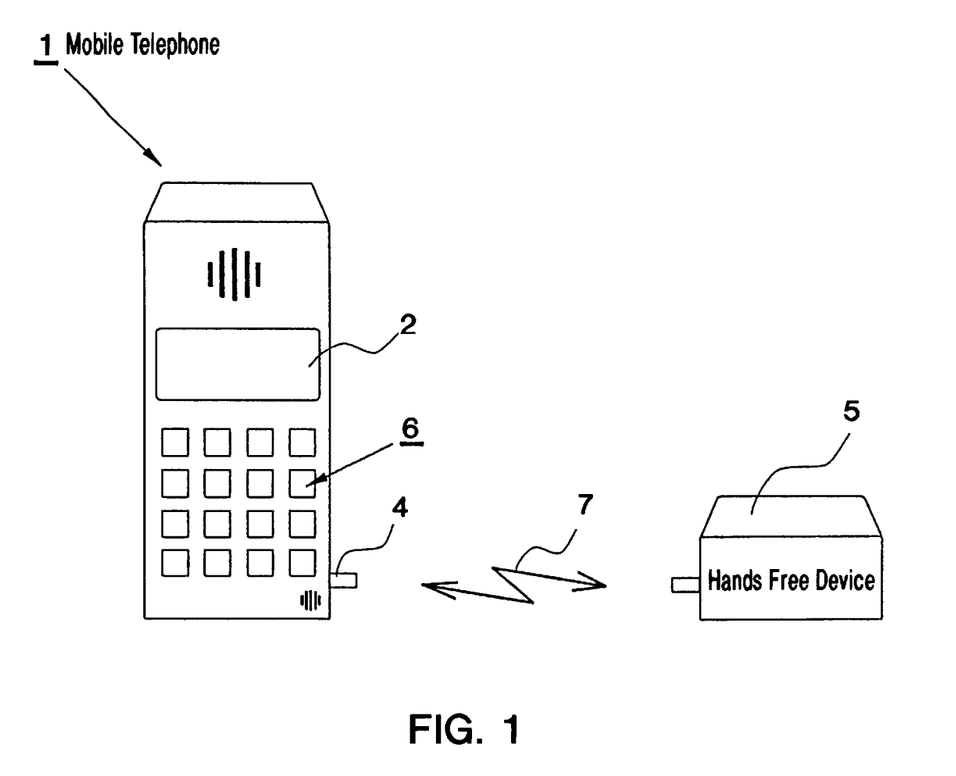
FIG. 1 illustrates a mobile telephone to which an accessory unit can be connected.

FIG. 1 illustrates a mobile telephone 1. The mobile telephone is part of a telecommunications system or network. As is well known in the art, the mobile telephone communicates with the telecommunications network via a wireless radio or microwave frequency link between the mobile telephone and an element in the network, for example a base station in a cell where the mobile telephone is located. The mobile telephone includes a display 2 and a keypad 6. Different user menus can be presented on the display 2. A mobile telephone user is able to flip through the various user menus, by pressing appropriate buttons on the keypad. The user menus show the various functions and user data of the telephone. A menu that shows different mobile telephone setting data is one example of a user menu. The setting data may, for instance, show when a call transfer is activated or when the telephone is blocked for certain types of outgoing calls. Another example of when a menu is used is when a portable computer is connected to the mobile telephone for cordless transmission of data. When connecting a portable computer to the telephone, it is often necessary to adapt the mobile telephone to the computer, or vice versa. The transmission rate setting is one example of such adaptation. In order to set the data transmission rate, it is necessary to use a user menu by means of which a user can be guided through the various setting options. In this regard, the user moves a cursor through the menu with the aid of the telephone keypad 6 and chooses one of several possible options, for instance 9600 bit/s or 28800 bit/s.

The mobile telephone also includes a connection means 4. In the FIG. 1 embodiment, an accessory unit 5 has been connected to the mobile telephone 1 via the connection means 4, with the aid of an IR-connection (Infrared connection) 7. The accessory unit will be described further on in the text in conjunction with describing the inventive method.

Figure 2:
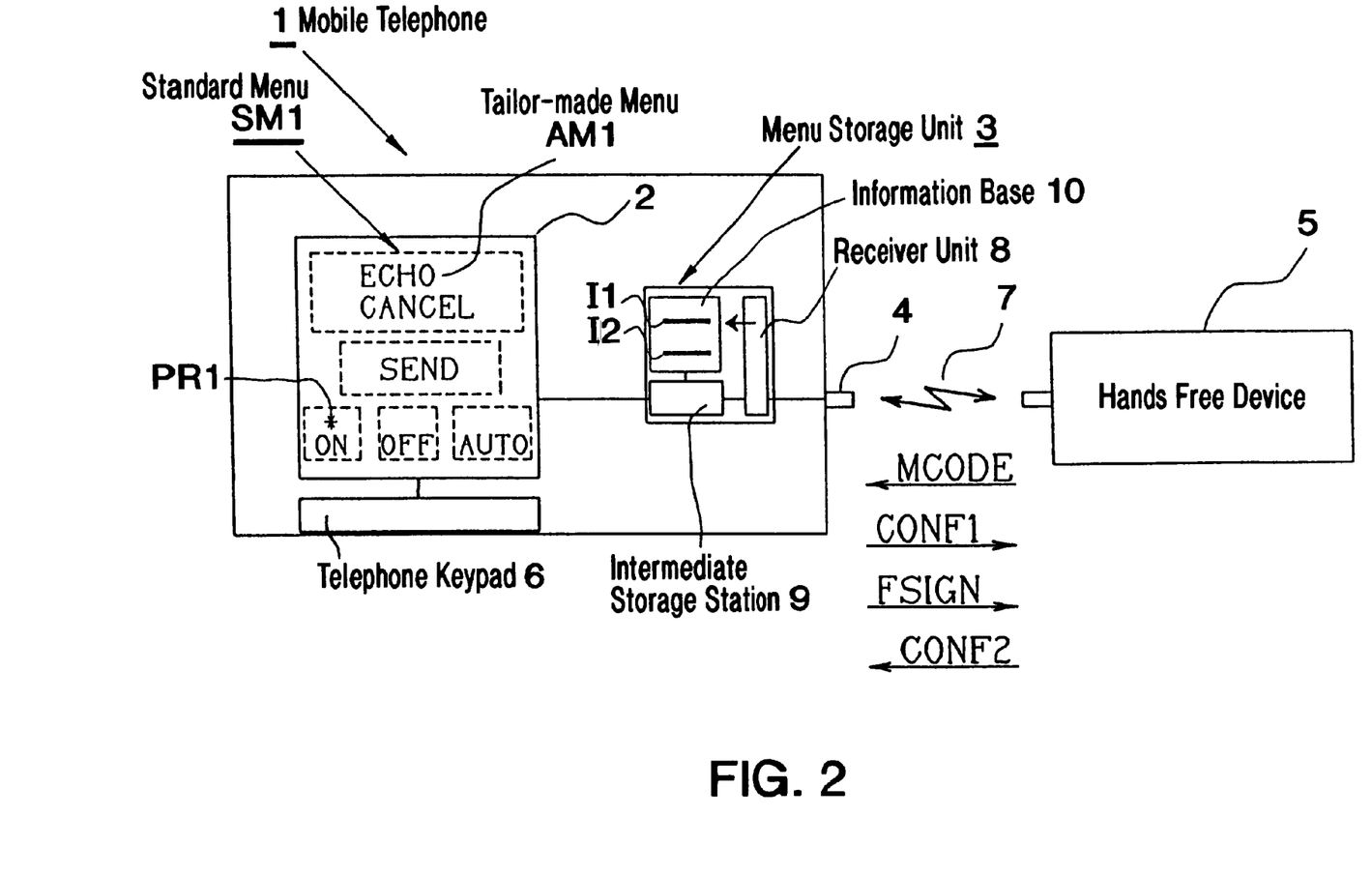
FIG. 2 is a block schematic illustrating the configuration shown in FIG. 1.

FIG. 2 is a block schematic that illustrates the mobile telephone 1 and the accessory unit 5. FIG. 2 includes the earlier mentioned display 2, the connection means 4 and the IR-connection 7. The Figure also shows that the mobile telephone 1 includes a menu storage unit 3 which, in turn, includes an information base 10. Information can be stored in the base 10 for later use in creating different standard menus. One standard menu is found initially in the mobile telephone, this standard menu being a general menu that constitutes a menu framework that can be used in accordance with the invention for creating several different user menus. The menu framework is shown in the display in FIG. 2 in broken lines and is referenced SM1 in the Figure. The standard menu SM1 can be restructured to a "tailor made" user menu AM1 that is presented on the display 2. The user menu AM1 is symbolised in FIG. 2 by the text "ECHO CANCEL" which is inserted in the standard menu and which in this illustrated case indicates that the accessory unit includes an echo cancelling function. This re-structuring of the standard menu SM1 will be described in more detail in conjunction with the description of the inventive method. The menu storage unit 3 is connected to both the connection means 4 and the display 2. The information base 10 includes an address part and a data part. The earlier mentioned information is stored in the data part in accordance with an address in the address part. The menu storage unit 3 also includes a receiver unit 8 in which address information can be received, and an intermediate storage unit 9 which has a display drive capability and in which data can be stored intermediately and re-structured for later display on the display 2.

A first exemplifying embodiment of the invention will now be described with reference to FIGS. 2 and 3 and with reference to an inventive method. The earlier mentioned accessory unit is a so-called hands-free device 5. The hands-free device includes an echo canceller that is used to cancel echo effects. Echo cancellers are well known to the skilled person and will not therefore be described in more detail here. The echo canceller included in the hands-free device 5 is not shown in FIG. 2 or in FIG. 3. The hands-free device 5 has been produced, i.e. developed, subsequent to the development of the mobile telephone 1 and the telephone therefore lacks a memory support for the echo canceller. The inventive method comprises the steps of:

Storing information I1, I2 in the information base 10 in the menu storage unit 3. The information is stored in accordance with predetermined addresses in the address part of the information base 10. Standard menus of mutually different configurations can be created with the aid of the information I1, I2. In the illustrated embodiment, two different types of information have been stored, a so-called first information type I1 and a second information type I2. One of two different standard menus can be created in the display 2 on the basis of this information, i.e. a so-called first standard menu SM1, shown in FIG. 2 in broken lines, and a second standard menu. The second standard menu is not shown in the Figures. The information is stored in conjunction with manufacturing the user unit.

Connecting the hands-free device 5 to the mobile telephone 1. The device is connected to the connection means 4 in the mobile telephone with the aid of the IR-connection 7.

Transmitting to the receiver unit 8 a menu selection code MCODE from the hands-free device 5, via the IR-connection 7 and the connection means 4. The menu selection code MCODE includes one of the earlier mentioned predetermined addresses in the information base 10. When the menu code MCODE is received in the receiver 8 in the menu storage unit 3, address information is collected from the code MCODE. The address information is used in the information data base 10 to point out information in the data part. The standard menu SM1 is stored under corresponding addresses in the information base. The standard menu SM1 forms a suitable basis for creating an independent user menu relating to the echo canceller in the hands-free device 5. The menu selection code MCODE also includes adaptation data for adapting the chosen general standard menu to a device 5 user menu. In the illustrated embodiment, the adaptation data includes text strings that are adapted to the echo canceller.

Transmitting the first confirmation signal CONF1 from the receiver unit 8 in the mobile telephone 1 to the hands-free device 5. The confirmation signal CONF1 confirms the receipt of the menu selection code MCODE.

Pointing out desired information, by pointing out the address in the information base 10 that corresponds to the address in the menu selection code MCODE. In the illustrated case, the first information type I1 is pointed out.

Collecting the information I1 at the address in the menu storage unit 3 and inserting said information in the intermediate storage unit 9 in the menu storage unit.

Adapting the information I1 in the intermediate storage unit 9 in accordance with the adaptation data in the menu selection code MCODE, such as to form a user menu AM1. The user menu is adapted to control the echo canceller.

Constructing and activating the user menu AM1 in the display 2. The user menu is constructed in the display with the aid of the adapted information I1 in the intermediate storage unit 9. The standard menu SM1 has been shown in broken lines in FIG. 2. The standard menu SM1 has been supplemented with text that is particularly adapted to the echo canceller in the hands-free device 5. The text-supplemented standard menu SM1 thus forms the user menu AM1.

When the user of the mobile telephone 1 wishes to utilize the echo cancelling function included in the hands-free device, he is able to activate said function with the aid of the earlier mentioned keypad 6, e.g. by moving the cursor PR1 through the menu. When the cursor PR1 is located on the desired function, the user is able to activate said function through the keypad 6. The inventive method then continues with the following further steps, when the user wishes to select a function in the echo canceller:

Moving the cursor through the user menu AM1 to the location of the desired function. In the illustrated case, the user has moved the cursor PR1 to the function "ON".

Selecting the desired function. In the illustrated case, the user elects to start the echo canceller by pressing an appropriate button on the keypad 6 when the cursor in the display is located on the function "ON".

Sending a function signal FSIGN from the mobile telephone 1 to the echo canceller. The function signal indicates that the user has elected to start the echo canceller by selecting the function "ON".

Activating the chosen function in the echo canceller after receiving the function signal FSIGN.

Sending a second confirmation signal CONF2 from the echo canceller in the hands-free device 5 to the mobile telephone 1.

Figure 3:
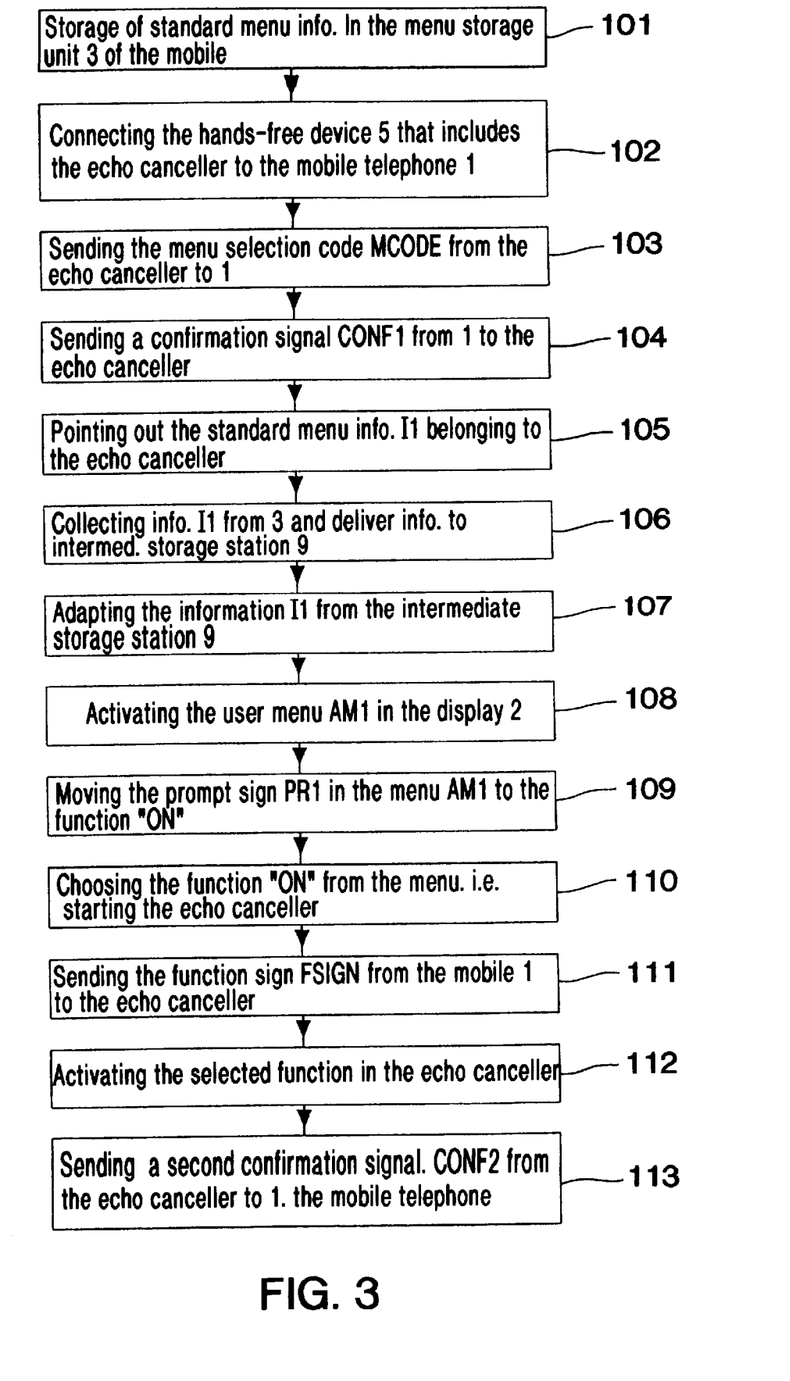
FIG. 3 is a flowchart of an inventive method in which the configuration shown in FIG. 1 has been applied.

FIG. 3 is a flowchart that illustrates the aforedescribed method. The flowchart illustrates the method steps that are most significant to the invention. The abbreviations used in the Figure text are considered to have been adequately explained with reference to FIGS. 1 and 2 above. The method is implemented in accordance with FIG. 3 and in accordance with the following description:

Information I1, I2 is stored in the information base 10 in the menu storage unit 3, in accordance with block 101 in FIG. 3.

The hands-free device 5 is connected to the mobile telephone 1 in accordance with a block 102. The hands-free device includes the echo canceller.

The menu selection code MCODE is sent from the hands-free device 5 to the receiver unit 8 via the IR-connection 7 and the connection means 4, in accordance with block 103. As before mentioned, the menu selection code MCODE includes one of the predetermined addresses in the information base 10. The menu selection code MCODE also includes adaptation data for adapting the chosen general standard menu to the user menu.

The first confirmation signal CONF1 is sent to the hands-free device 5 from the receiver unit 8 in the mobile telephone 1, in accordance with block 104.

Desired information is pointed out by pointing out the address in the information base 10 that corresponds to the address in the menu selection code MCODE, in accordance with block 105.

Information I1 is collected from the address in the menu storage unit 3 and inserted in the intermediate storage unit 9 in the menu storage unit, in accordance with block 106.

Information I1 is adapted in the intermediate storage unit 9 in accordance with the adaptation data in the menu selection code MCODE, so as to construct a user menu AM1, in accordance with block 107. The user menu is adapted to control the echo canceller.

The user menu AM1 is activated in the display 2, in accordance with block 108. The user menu is constructed with the aid of the text-supplemented standard menu SM1.

The cursor is moved through the user menu AM1 to the desired function "ON", in accordance with block 109.

In this embodiment, the desired function selected by the user is that of starting the echo canceller, in accordance with block 110.

A function signal FSIGN is sent from the mobile telephone 1 to the echo canceller, in accordance with block 111. The function signal indicates that the user has elected to start the echo canceller, by selecting the function "ON".

The selected echo canceller function is activated, in accordance with block 112.

A second confirmation signal CONF2 is sent from the echo canceller in the hands-free device 5 to the mobile telephone 1, in accordance with block 113.

Figure 4:
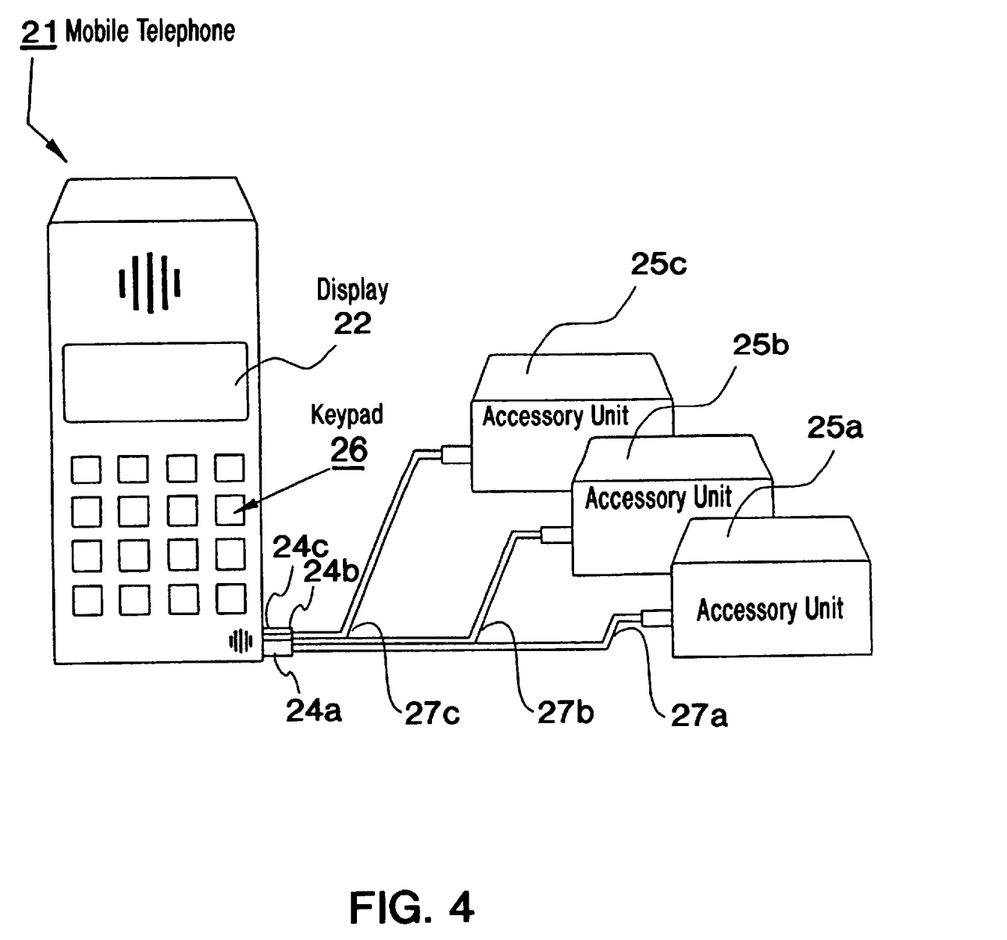
FIG. 4 illustrates a mobile station to which three different accessory units can be connected.

FIG. 4 illustrates a second embodiment of the invention. This embodiment includes a mobile telephone 21 that has a display 22 and a keypad 26. In the case of this embodiment, the mobile telephone 21 also includes three connection means 24*a*, 24*b*, 24*c*. Three different accessory units 25*a*, 25*b* and 25*c* have been connected to the mobile telephone 21 by means of cables 27*a*, 27*b*, 27*c*, via the connection means 24*a*, 24*b*, 24*c*. According to this embodiment, the first accessory unit is a computer 25*a*. Connection of the computer to the mobile telephone enables the wireless transmission of data to or from the computer. The second accessory unit is a telefacsimile machine 25*b*, and the third accessory unit is an external mobile charging unit 25*c*.

Figure 5:
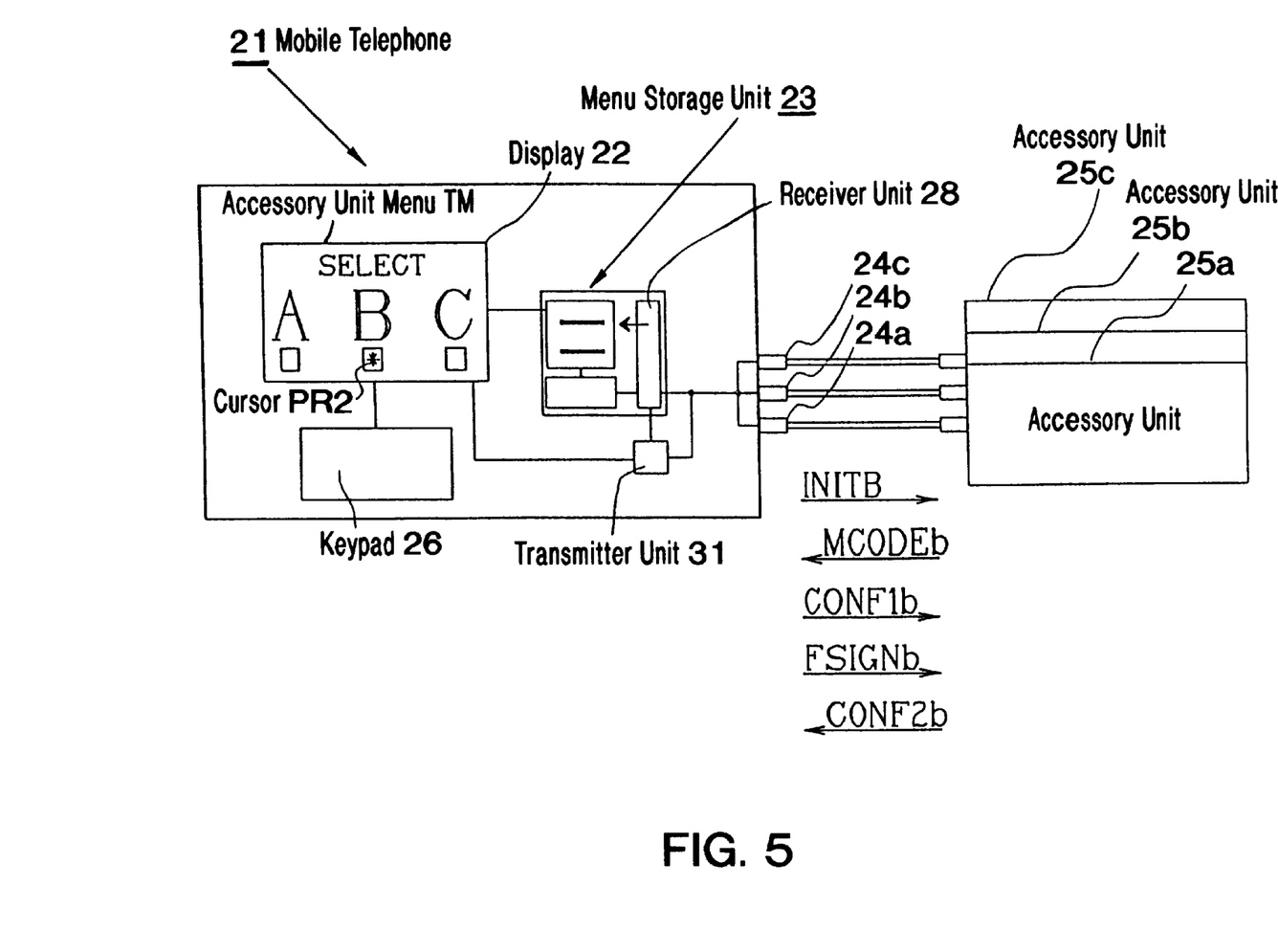
FIG. 5 is a block schematic that illustrates the configuration in FIG. 4.

FIG. 5 is a block schematic illustrating the mobile telephone 21 and the accessory units 25*a*, 25*b* and 25*c*. The Figure also shows the earlier mentioned display 22, the connection means 24*a*, 24*b* and 24*c* and the cables 27*a*, 27*b*, 27*c*. It will also be evident from the Figure that the mobile telephone includes a menu storage unit 23 that is of the same type as the menu storage unit already described in the previous embodiment and shown in FIG. 2. The menu storage unit 23 is connected to all connection means 24a, 24b and 24c. The mobile telephone also includes a transmitter unit 31 which, in the illustrated case, is connected between the menu storage unit 23 and the connection means. Data is sent from the mobile to the connected accessory units 25a, 25b and 25c with the aid of the transmitter unit 31. The display is connected to both the menu storage unit 23 and to the transmitter unit 31. The display 22 is also connected to the keypad 26.

A second embodiment of the invention will now be described, wherein an inventive method will be illustrated with reference to FIGS. 4 and 5. The embodiment exemplifies the manner in which the memory space in the mobile telephone 21 is utilized optimally when more than one accessory unit is connected to the mobile telephone 21. In the case of this second embodiment, it is of less importance whether or not the accessory unit developed in conjunction with the development of the mobile telephone or subsequent thereto.

The method according to this aspect of the invention comprises the steps of:

Storing information in the menu storage unit 23. This information enables different standard menus to be created and shown on the display 22.

Storing an accessory unit memo TM in the menu storage unit 23 in the mobile telephone 21. The configuration of the accessory unit menu TM shown on the display 22 is evident from FIG. 5. The accessory unit menu TM includes a choice between three options, options A, B and C. Each option corresponds to one of the connection means 24a, 24b and 24c. An option can be chosen, by moving a cursor PR2 through the menu with the aid of the keypad 26. This choice will be explained hereinafter.

Connecting the computer 25a, the telefacsimile machine 25b and the telephone charger 25c to the mobile telephone 1. The three accessory units are connected with the aid of cables, via the three connection means 24a, 24b and 24c.

Bringing forward the accessory unit menu TM in the mobile telephone 21. This menu is brought forward by the mobile user surfing through the different pre-programmed menu options until the accessory unit menu TM is located.

Option B is chosen by the user, by moving the cursor PR2 to the desired option, and is selected with the aid of the keypad 26.

An initiation message INITB is sent from the mobile telephone 1 to the telefacsimile machine 25b, via the transmitter unit 31. The user menu of the telefacsimile machine 25b is activated when the telefacsimile machine receives the initiation message. This activation is effected in the same way as the activation that was earlier described with reference to the previous embodiment illustrated in FIG. 3. The user is able to operate the telefacsimile machine 25b, upon completion of activation of the menu. If the user had desired to activate the computer 25a instead, option A would have been chosen in the accessory unit menu TM and the computer user menu would have been created on the display 22.

Figure 6:
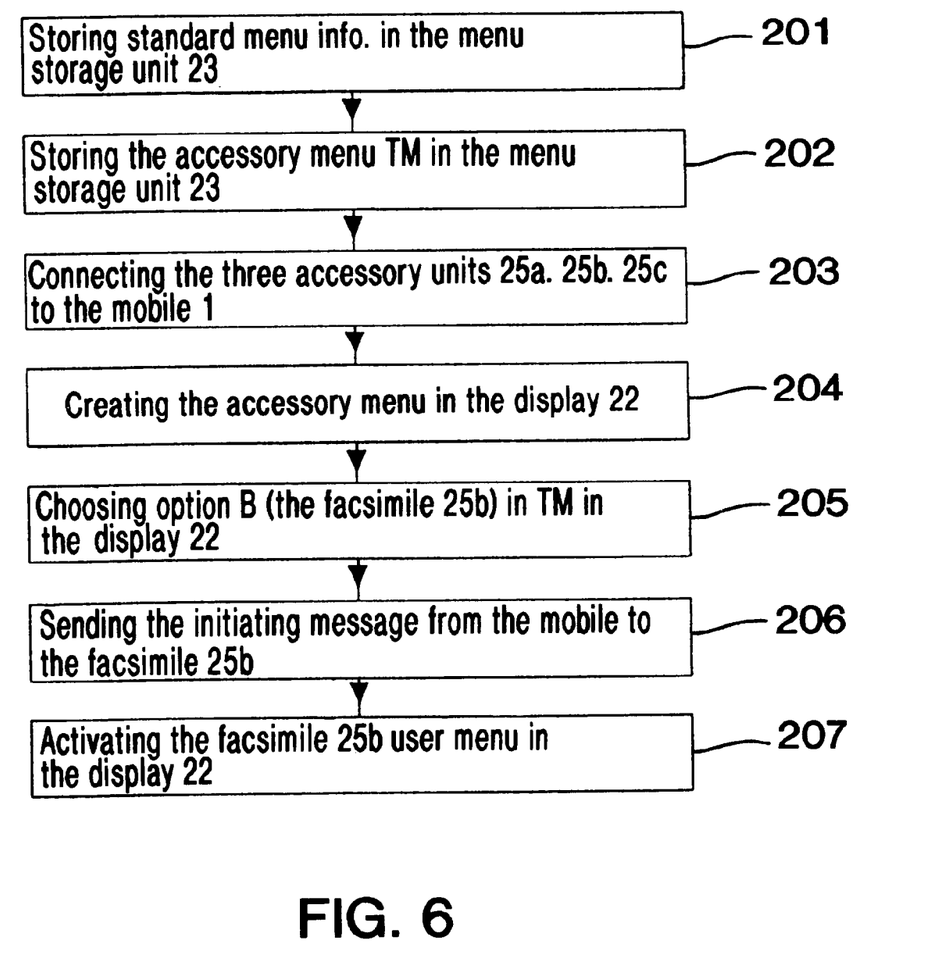
FIG. 6 is a flowchart illustrating an inventive method in which the configuration shown in FIG. 4 has been applied.

FIG. 6 is a flowchart that illustrates the aforedescribed method. The flowchart includes those method steps that are most significant to the invention. It is believed that the abbreviations used in the Figure text have been adequately explained with reference to FIGS. 4 and 5. The method is implemented in accordance with FIG. 6 and in accordance with the following description and comprises the steps of:

Storing the information in the menu storage unit 23, in accordance with block 201. Various standard menus can be created and shown on the display 22 on the basis of this information.

Storing the accessory unit menu TM in the menu storage unit 23 in the mobile telephone 21, in accordance with block 201.

Connecting the computer 25a, the telefacsimile machine 25b and the telephone charger 25c to the mobile telephone 1, in accordance with block 202. The three accessory units are connected with the aid of cables, via the three connection means 24a, 24b and 24c.

Bringing forward the accessory unit menu TM on the display 22 in the mobile telephone 21, in accordance with block 203. The menu TM is brought forward by the user of the mobile surfing through different pre-programmed menu options until the accessory unit menu TM is located.

Selecting the option B with the aid of the keypad 26, in accordance with block 204.

Sending an initiation message INITB from the mobile telephone 1 to the telefacsimile machine 25b, via the transmitter unit 31, in accordance with block 205.

Initiating activation of the telefacsimile user menu in accordance with block 206.

Figure 7:
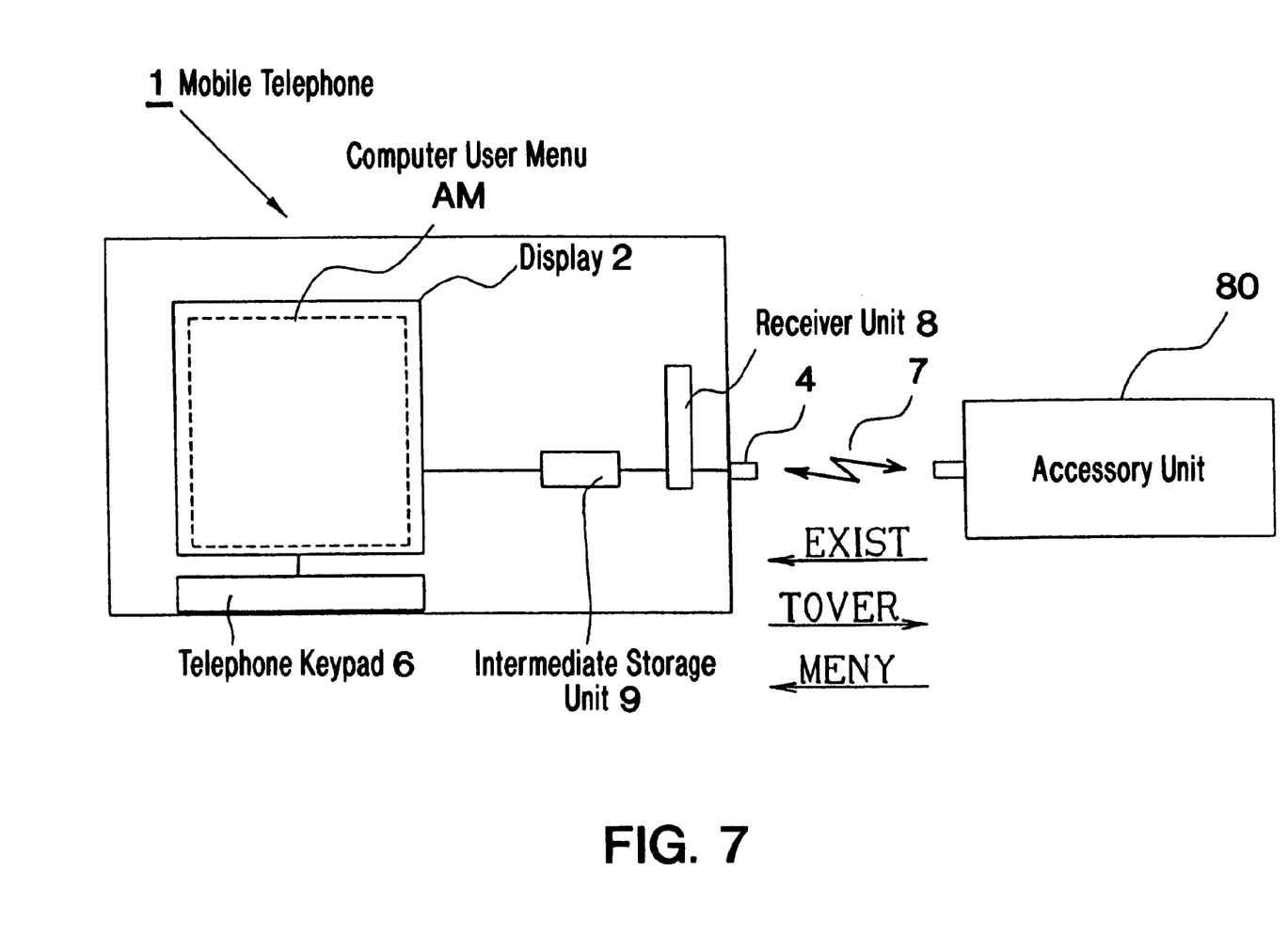
FIG. 7 illustrates a mobile telephone to which a computer has been connected.

FIG. 7 illustrates a further embodiment of the invention. The Figure shows the same mobile telephone 1 as that earlier described with reference to FIG. 3, but with the difference that the menu storage unit includes only the receiving unit 8 and the intermediate storage unit 9. The accessory unit that is connected to the mobile telephone 1 in accordance with the method described below is a computer unit 80. In the method that will now be described in more detail, the earlier mentioned standard menu that was re-structured to the user menu in the previous embodiment is no longer necessary. The method is a simplified version of the earlier described methods and, in brief, is based on the transmission from the computer to the mobile telephone of all of the information that is required to create a computer user menu AM. The method comprises the steps of:

Connecting the computer 80 to the mobile telephone 1.

Sending a prompt signal EXIST which indicates to the user unit, in the illustrated case the mobile telephone 1, that the accessory unit includes menu information.

Setting up a signal connection between the two units 1, 80.

The user of the mobile telephone 1 activates a known menu setting function in the mobile telephone to enable a choice to be made between two types of main menus. The two main menus available are internal menus and external menus. In the illustrated case, the user chooses the external menu option, since an external appliance is connected to the mobile telephone 1.

Sending a take-over signal TOVER from the mobile telephone 1 to the computer 80. The signal orders the computer to send menu information to the mobile telephone.

Sending menu data MENYD for the user menu AM from the computer 80 to an intermediate storage unit 9 in the mobile telephone 1.

Activating the user menu AM in the presentation means 2 of the mobile telephone. The computer can now be operated via the user menu, with the aid of the earlier mentioned control unit 6 in the mobile telephone 1.

Figure 8:
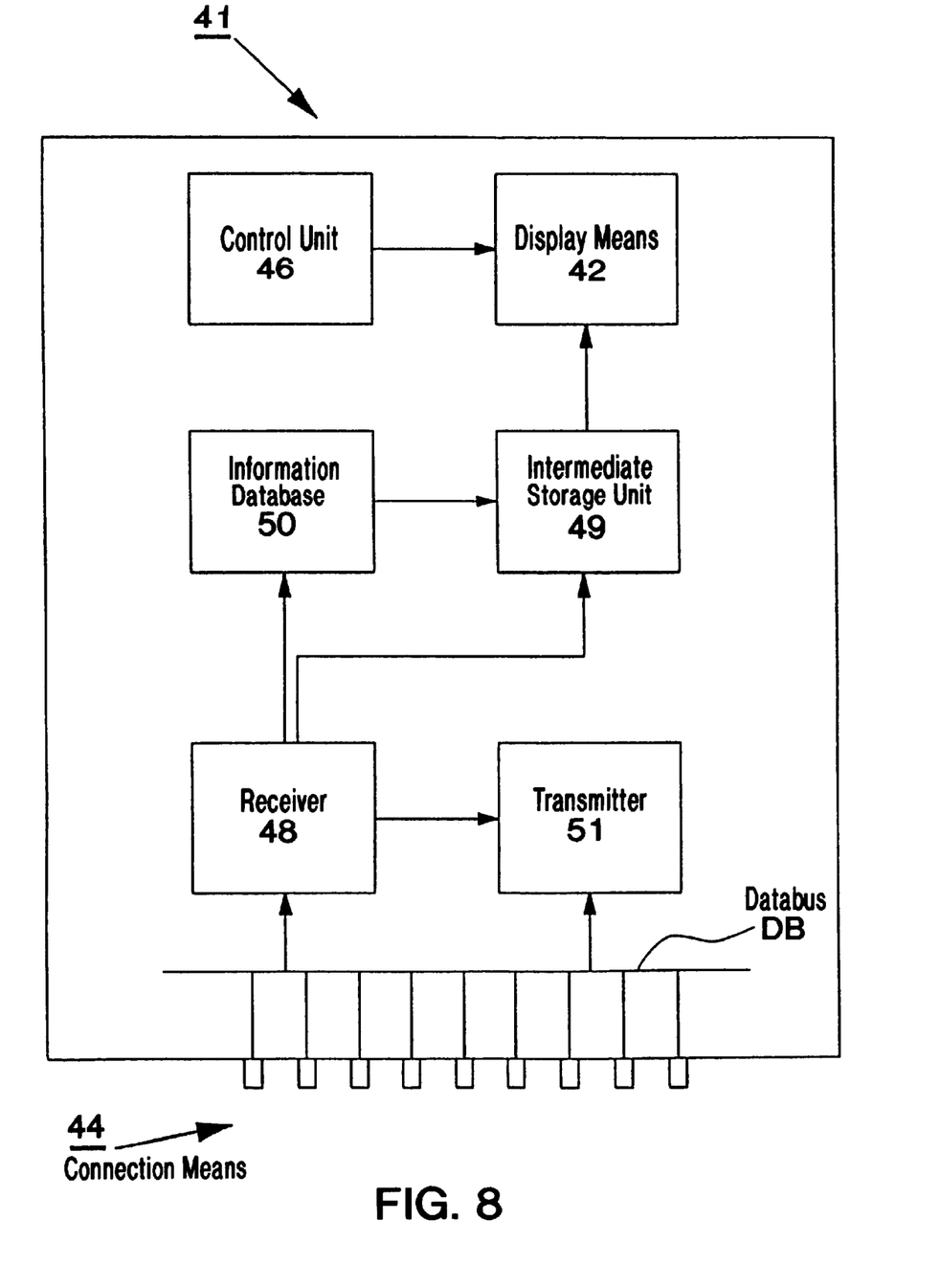
FIG. 8 is a block schematic illustrating an inventive device.

FIG. 8 is a block schematic that illustrates an inventive device 41. For reasons of clarity, those units in FIG. 8 that find correspondence in FIG. 5 have been presented within parenthesis. The device 41 (21) includes a display means 42 (22) in which different menus can be shown. A control unit 46 (26) is connected to the display means. The control unit enables various options to be selected from a user menu presented on the display 42 (22). The device 41 also includes a plurality of connection means 44 (24) to which external accessory units can be connected. The connection means 44 are connected to a data bus DB. A receiver 48 (28) which receives signals sent to the device 41 from the external accessory units, and a transmitter 51 (31) for transmitting signals from the device (41) to the accessory units are also connected to the data bus DB and to each other. The device 41 also includes an information data base 50 and an intermediate storage unit 49. The information data base 50 is unnecessary when a menu is sent in its entirety from an accessory unit connected to the device 41. Different standard menus may be stored in the information data base 50. The intermediate storage unit 49 is used for the intermediate storage of the standard menus and their reconstruction. The information data base 50 and the intermediate storage unit 49 are connected to each other. The intermediate storage unit 49 is also connected to the display unit 42 and also to the receiver 48.

A number of other variations are conceivable within the scope of the inventive concept. For instance, it is not necessary for the user unit to be a mobile telephone. Even other user units are applicable, for instance a permanently connected telephone, a person pager, and so on. Neither is it necessary for the user unit to be a unit within the technical field of telecommunications. Neither need the aforementioned presentation means be a display. For instance, the presentation means may be an auditive presentation means, such as a loudspeaker. Neither need surfing of the user menu be effected with the aid of a cursor, but can be effected by the user choosing the YES/NO options in the menu through the medium of the key bank. It will therefore be understood that the invention is not limited to the aforedescribed and illustrated exemplifying embodiments thereof and that modifications can be made within the scope of the following Claims.

We claim:

1. A method of creating a user menu in a presentation means in a mobile phone, wherein the user menu presents an accessory unit connected to the mobile phone, and wherein the method comprises the steps of:

storing information in a menu storage unit in the mobile phone for producing at least one standard menu;

connecting the accessory unit to the mobile phone;

sending a menu selection code from the accessory unit to the menu storage unit;

pointing out in the menu storage unit a standard menu that corresponds to the menu selection code; and adapting the pointed out standard menu to a user menu that corresponds to the menu selection code; wherein the mobile phone communicates with the accessory unit via a communication link that is separate from a wireless link between the mobile phone and a telecommunications network.

2. A method according to claim 1, further comprising the step of:

activating the user menu in the presentation means.

3. A method according to claim 1, wherein the method comprises the further steps of:

selecting one of the functions shown in the user menu, said selection being made by a user of the mobile phone;

sending a function signal from the mobile phone to the accessory unit; and activating the selected function in the accessory unit.

4. A method according to claim 3, wherein after receiving the function signal the method comprises the further step of:

sending a second confirmation signal from the accessory unit to the mobile phone.

5. Method of claim 1, wherein the separate communication link between the mobile phone and the accessory unit is a wireless link.

6. Method of claim 5, wherein the separate communication link between the mobile phone and tie accessory unit is an infrared connection.

7. Method of claim 1, wherein the separate communication link between the mobile phone and the accessory unit is a cable.

8. A method according to claim 1, further comprising the step of:

after the step of sending a menu selection code from the accessory unit to the menu storage unit, sending a first confirmation signal from the mobile phone to the accessory unit.

9. A method according to claim 1, wherein, after receiving the menu selection code the method includes the further step of:

transferring the information in the menu storage unit to an intermediate storage unit in the menu storage unit.

10. The method of claim 1, further comprising the step of sending the user menu in its entirety from the accessory unit to the mobile phone.

11. A device for creating a user menu in a mobile phone, said user menu depicting an accessory unit connected to the user menu creating device, wherein said user menu creating device includes a presentation means connected to a control unit, wherein said device also includes a connection means to which the accessory unit can be connected, wherein said connection means is connected to a data bus, wherein the user menu creating device includes a receiver and a transmitter for respectively receiving and transmitting signals from/to the external accessory unit via a communication link that is separate from a wireless link between the mobile phone and a telecommunications network, wherein the receiver and transmitter are connected to each other, and wherein the user menu creating device also includes an intermediate storage unit which is connected to the receiver and to the presentation means.

12. A user menu creating device according to claim 11, wherein the device also includes an information data base which is connected to both the intermediate storage unit and to the receiver.

13. A device for creating a user menu in a mobile phone according to claim 12, wherein the receiver in said device is adapted to receive at least one menu selection code, said menu code including at least one address data part and at least one adaptation data part.

14. The device of claim 13, wherein the at least one address data part indicates a storage location in the mobile phone of a menu identified by the menu code.

15. A method of creating a user menu in a presentation means of a mobile phone, wherein the user menu is presented in an accessory unit connected to the mobile phone, and wherein the method comprises the steps of:

connecting the accessory unit to the user unit via a communication link that is separate from a wireless link between the mobile phone and a telecommunication network;

sending a prompt signal which indicates to the mobile phone that the accessory unit includes menu information;

sending a takeover sign from the mobile phone to the accessory unit, said signal ordering the accessory unit to send menu information;

sending menu data from the accessory unit to an intermediate storage unit in the mobile phone, said data including information necessary for creating the user menu; and activating the user menu in the presentation means.

16. The method of claim 15, further comprising the step of sending the user menu in its entirety from the accessory unit to the mobile phone.

17. A method of creating a user menu in a presentation means in a user unit, wherein the user menu presents an accessory unit connected to the user unit, and wherein the method comprises the step of:

storing information in a menu storage unit in the user unit for producing at least one standard menu;

connecting the accessory unit to the user unit;

sending a menu selection code from the accessory unit to the menu storage unit;

pointing out in the menu storage unit a standard menu that corresponds to the menu selection code;

adapting the pointed out standard menu to a user menu that corresponds to the menu selection code;

storing an accessory unit menu in the menu storage unit;

connecting at least one further accessory unit to the user unit;

selecting one of the connected accessory units from the accessory unit menu; and sending an initiating message from the user unit to the selected accessory unit.

18. A method of creating a user menu in a presentation means in a user unit, wherein the user menu presets an accessory unit connected to me user unit, and wherein the method comprises the steps of:

storing information in a menu storage unit in the user unit for producing at least one standard menu;

connecting the accessory unit to the user unit;

sending a menu selection code from the accessory unit to the menu storage unit;

pointing out in the menu storage unit a standard menu that corresponds to the menu selection code; and adapting the pointed out standard menu to a user menu that corresponds to the menu selection code; wherein the accessory unit is a telefacsimile device.

19. A method of crag a user menu in a presentation means a user unit, wherein the user menu presents an accessory unit connected to the user unit, and wherein the method comprises the steps of:

storing information in a menu storage unit in the user unit for producing at least one standard menu;

connecting the accessory unit to the user unit;

sending a menu selecting code from the accessory unit to the menu storage unit;

pointing out in the menu storage unit a standard menu that corresponds to the menu selection code; and adapting the pointed out standard menu to a user menu that corresponds to the menu selection code; wherein the accessory unit is an echo canceler.

20. A method of creating a user menu in a presentation means in a user unit, wherein the user menu presents an accessory unit connected to the user unit, and wherein the method comprises the steps of:

storing information in a menu storage it in the user unit for producing at least one standard menu;

connecting the accessory unit to the user unit;

sending a menu selection code from the accessory unit to the menu storage unit;

pointing out in the menu storage unit a standard menu that corresponds to the menu selection code; and adapting the pointed out standard menu to a user menu that corresponds to the menu selection code; wherein the accessory unit is an external mobile charging unit.

21. A method of creating a user menu in a presentation means in a user unit, wherein the user menu presents an accessory unit conned to the user unit, and wherein the method comprises the steps of:

storing information in a menu storage unit in the user unit for producing at least one standard menu;

connecting the accessory unit to the user unit;

sending a menu selection code from the accessory unit to the menu storage unit;

pointing out in the menu storage unit a standard menu that corresponds to the menu selection code; and adapting the pointed out standard menu to a user menu that corresponds to the menu selection code; wherein the accessory unit is a computer.

* * * * *